(12) United States Patent
Lee et al.

(10) Patent No.: US 7,184,372 B2
(45) Date of Patent: Feb. 27, 2007

(54) APPARATUS AND METHOD FOR EJECTING/LOADING TRAY OF OPTICAL DISK PLAYER

(75) Inventors: Young-won Lee, Gyeonggi-do (KR); Young-sun Seo, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 911 days.

(21) Appl. No.: 10/231,054

(22) Filed: Aug. 30, 2002

(65) Prior Publication Data

US 2003/0043702 A1 Mar. 6, 2003

(30) Foreign Application Priority Data

Aug. 31, 2001 (KR) ............................... 2001-53268

(51) Int. Cl.
*G11B 17/22* (2006.01)
(52) U.S. Cl. .............................. 369/30.32; 369/191.01; 369/75.21
(58) Field of Classification Search ............. 369/30.24, 369/44.27, 53.19, 44.32, 197, 30.32, 75.11, 369/75.21, 178.01, 179, 191.1, 192.1, 30.09, 369/30.06; 360/98.01; 720/601, 656
See application file for complete search history.

(56) References Cited

U.S. PATENT DOCUMENTS

| | | |
|---|---|---|
| 5,539,717 A | 7/1996 | Choi |
| 5,631,882 A | 5/1997 | Mascenik |
| 6,122,237 A * | 9/2000 | Ohmori et al. .......... 369/53.19 |

FOREIGN PATENT DOCUMENTS

| | | |
|---|---|---|
| JP | 06290013 A | 10/1994 |
| JP | 07191835 A | 7/1995 |
| JP | 07281807 | 10/1995 |
| JP | 08101803 A | 4/1996 |
| JP | 10111849 A | 4/1998 |
| JP | 11296469 A | 10/1999 |
| JP | 11327828 A | 11/1999 |

(Continued)

OTHER PUBLICATIONS

Chinese Abstract for Chinese Patent Publication No. 1120213, published Apr. 10, 1996.

(Continued)

*Primary Examiner*—Ali Neyzari
(74) *Attorney, Agent, or Firm*—Staas & Halsey LLP

(57) ABSTRACT

An apparatus and method of ejecting/loading a tray of an optical disk player using a digitizer connected to a personal computer (PC) or a keyboard, even though an EJECT button is not installed on a control panel of an optical disk includes using a optical disk control program stored in the optical disk player. The optical disk control program is to be installed in a personal computer (PC) and controls the ejection/loading of a tray of an optical disk player. If a predetermined key or key combination is entered through the computer, an EJECT or LOAD command is applied to the optical disk player in response to entering of the predetermined key combination via the optical disk control program. The tray of the optical disk player can be ejected/loaded using the keyboard or digitizer, and thus there is no need to install the EJECT button in the optical disk player.

32 Claims, 3 Drawing Sheets

FOREIGN PATENT DOCUMENTS

| | | | |
|---|---|---|---|
| JP | 2000194563 A | 7/2000 | |
| JP | 2000284918 A | 10/2000 | |
| JP | 2000339263 A | 12/2000 | |
| JP | 2001256170 A | 9/2001 | |
| JP | 2002041442 A | 2/2002 | |
| JP | 2002055824 A | 2/2002 | |
| KR | 1998-12324 | 5/1998 | |

OTHER PUBLICATIONS http://downloads-zdnet.com, HotKey CD-Eject 2.1, Aug. 14, 2002.
http://downloads-zdnet.com, SoftEject 1.0, Aug. 14, 2002.
http://downloads-zdnet.com, WinEject 2.0, Aug. 14, 2002.

* cited by examiner

APPARATUS AND METHOD FOR EJECTING/LOADING TRAY OF OPTICAL DISK PLAYER

CROSS-REFERENCE TO RELATED APPLICATION

This application claims the benefit of Korean Application No. 2001-53268 filed Aug. 31, 2001, in the Korean Industrial Property Office, the disclosure of which is incorporated herein by reference.

BACKGROUND OF THE INVENTION

1. Field of the Invention

The present invention relates to an apparatus to eject/load a tray of an optical disk player mounted on a personal computer (PC), and more particularly, to a method and apparatus that ejects/loads a tray of an optical disk player using a digitizer or a keyboard connected to the PC even though an EJECT button is not installed on a control panel of the optical disk player.

2. Description of the Related Art

There are two methods for loading/ejecting an optical disk into/out of an optical disk player. One method is to use an EJECT button installed on a control panel of the optical disk player. The other method is an EJECT/LOAD command applied by the application software being used on a personal computer (PC), such as the WINDOWS MEDIA PLAYER. In the former method, the EJECT button should be installed in the optical disk player. This adversely affects the freedom to design the optical disk player. In the latter method, an application program which controls the optical disk player should be installed on a PC. However, these application programs can be used only on condition that an optical disk has multimedia files, such as AUDIO-CD and VIDEO-CD.

In general, if the application program does not function, the tray of the optical disk player is ejected by pushing the EJECT button, the optical disk is loaded on the tray, and then the tray is inserted in the optical disk player by again pushing the EJECT button or by pushing the tray itself. Meanwhile, if the application program functions, the tray is ejected/loaded using either the EJECT button or executing the EJECT/LOAD command. If either there was not the application program installed or there was only a file without a multimedia file format, because the ejection/loading of the tray cannot be controlled in the application program, the EJECT button installed on an operation panel of the optical disk has to be used.

Likewise, in a conventional method for ejecting/loading a tray of an optical disk player, it is necessary to install the EJECT button on the control panel, and thus the freedom to design is limited and further increases costs.

SUMMARY OF THE INVENTION

To solve the above and other problems, it is an object of the present invention to provide a method of ejecting/loading a tray of an optical disk player using a digitizer or keyboard.

It is another object of the present invention to provide an apparatus to perform the method.

It is still another object of the present invention to provide an optical disk player to perform the method.

Additional objects and advantages of the invention will be set forth in part in the description which follows and, in part, will be obvious from the description, or may be learned by practice of the invention.

Accordingly, to achieve the above and other objects, a method of ejecting/loading a tray of an optical disk player according to an embodiment of the invention includes storing an optical disk control program in the optical disk player, the optical disk control program to be installed in a personal computer (PC) and controls ejection/loading the tray of the optical disk player, installing the optical disk control program stored in the optical disk player in the PC when the optical disk player is mounted on the PC, and using the installed optical disk control program to check whether a predetermined key is input through a keyboard, and if the predetermined key is entered, using the installed optical disk control program to apply an EJECT or LOAD command to the optical disk player in response to the input predetermined key.

According to another embodiment of the invention, an apparatus to eject/load a tray of an optical disk player includes an optical disk player having an internal memory, an optical disk control program to eject/load the tray of the optical disk player and which is stored in the internal memory of the optical disk player, a computer to read the optical disk control program from the optical disk player and to control the optical disk player using the read optical disk control program, and a keyboard to which an operation command of the computer is applied.

According to an aspect of the invention, if a predetermined key is entered using the keyboard, the computer uses the optical disk control program to apply an EJECT or LOAD command to the optical disk player in response to the entered predetermined key.

According to a further embodiment of the invention, an optical disk player includes a tray on which an optical disk is loaded by an eject/load operation, a microprocessor, and a memory, where an optical disk control program is stored in the memory, the optical disk control program is installed as an application program of a computer when the optical disk player is mounted on the computer, the optical disk control program checks whether a keyboard input is entered, and controls the ejection/loading of the tray in response to entering of the predetermined key or key combination if the predetermined key combination is entered, and the microprocessor controls the installation of the optical disk control program stored in the memory of the computer when the optical disk player is mounted on the computer.

BRIEF DESCRIPTION OF THE DRAWINGS

The above and other objects and advantages of the present invention will become more apparent and more readily appreciated by describing in detail embodiments thereof with reference to the attached drawings in which.

DETAILED DESCRIPTION OF THE EMBODIMENTS

Figure 1:
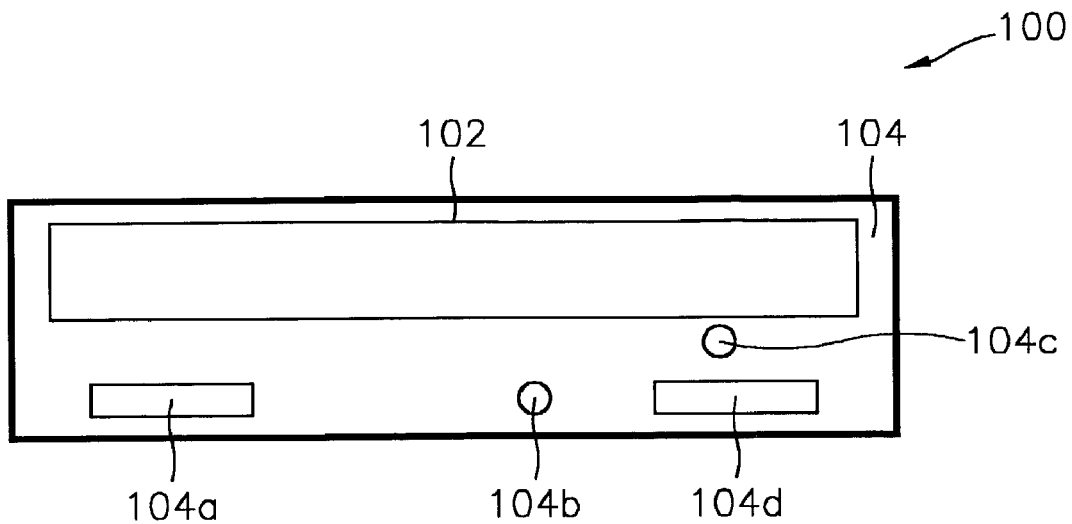
FIG. 1 illustrates the front appearance of an optical disk player.

Hereinafter, embodiments of the present invention will be described in detail with reference to the accompanying drawings, wherein like reference numerals refer to the like elements throughout. The embodiments are described below in order to explain the present invention by referring to the figures.

FIG. 1 illustrates the front appearance of a optical disk player 100 according to an embodiment of the invention. A tray 102 and a control panel 104 are installed on a front surface of the optical disk player 100. A VOLUME button 104A, an operation instruction light-emitting diode (LED) 104B, an emergency eject hole 104C, and an EJECT button 104D are installed on the control panel 104. A toggle operation is performed by the EJECT button 104D so as to eject/load the tray 102. More specifically, the tray 102 is ejected or loaded alternatively whenever the EJECT button 104D is pushed. After an optical disk is loaded into the optical disk player 100, data is read or written from or onto the optical disk by an operation command received from a personal computer (PC).

An emergency eject button (not shown) is installed in the inside of the emergency eject hole 104C. This button provides a security measure in a case where the tray 102 is not operated by the EJECT button 104D. An example is when a user wants to eject the tray 102 when power is not supplied to the optical disk player 100. Thus, the EJECT button 104D is useless when power is not supplied to the optical disk player. If the EJECT button 104D is installed in the optical disk player, due to increase in the number of components, productivity decreases, while costs increase.

Figure 2:
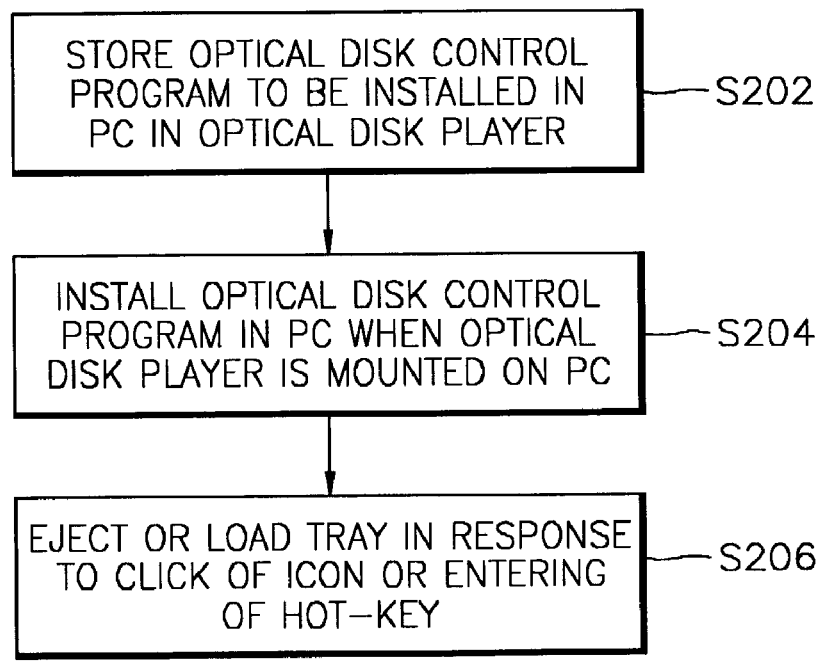
FIG. 2 is a flow chart illustrating a method for ejecting/loading a tray of an optical disk player according to an embodiment of the present invention.

FIG. 2 is a flow chart illustrating a method for ejecting/loading a tray 102 of the optical disk player 100 according to an embodiment of the present invention. In operation S202, an optical disk control program, which is to be installed in a personal computer (PC) and controls the ejection/loading of the tray 102 of the optical disk player 100, is stored in the optical disk player 100. When the optical disk player 100 is installed in the PC, the optical disk control program is read by the PC and is installed on the PC. Where the optical disk player 100 supports plug and play (i.e, the ability to plug a device into a computer and have the computer recognize that the device is there), the application programs are automatically installed by the PC, and the optical disk player 100 uses these functions.

In operation S204, when the optical disk player 100 is mounted on the PC, the optical disk control program stored in the optical disk player 100 is installed in the PC. A predetermined command is applied to the optical disk control program from a digitizer such as a mouse, or keyboard, and thus the optical disk control program functions such that ejection/loading of the tray 102 is controlled.

The ejection/loading of the tray 102 may be performed by one of two methods. One method is to click an icon installed on a desktop, and the other method is to use a predetermined key or key combination. In the former method, when the icon is clicked by a digitizer, such as a mouse, the optical disk control program is enabled. In the latter method, when predetermined key combination, such as shift+p, is entered via the keyboard, the optical disk control program is enabled. However, it is understood that other methods could be implemented.

In operation S206, when the icon is clicked or the predetermined key or key combination is entered, the tray 102 of the optical disk player 100 is ejected or loaded in response to the click of the icon or the entering of the hot-key.

The optical disk control program is performed when an operating system (OS), such as WINDOWS (produced by MICROSOFT Corporation), runs, and the optical disk control program lies in a standby state. While a user looks at the keyboard while entering data, the optical disk control program installed in the PC moves the tray of the optical disk drive to be ejected/loaded every time.

According to an aspect of the invention, the PC applies a control command to the optical disk player using a protocol, such as an ATAPI COMMAND, and the optical disk player ejects or loads the tray in response to the control command. The formatting of an EJECT command and a LOAD command are based on the protocol of the ATAPI COMMAND as seen below. The EJECT command is one for ejecting the tray, and the LOAD command is the other one for loading the tray.

EJECT command: 1B 00 00 00 02 00 00 00 00 00 00 00 00

LOAD command: 1B 00 00 00 03 00 00 00 00 00 00 00 00

These protocol ATAPI COMMANDs are generated by a program for controlling the optical disk player, and the optical disk player generates these protocol ATAPI COMMANDs in response to click of the icon or entering of the predetermined key or key combination.

Figure 3:
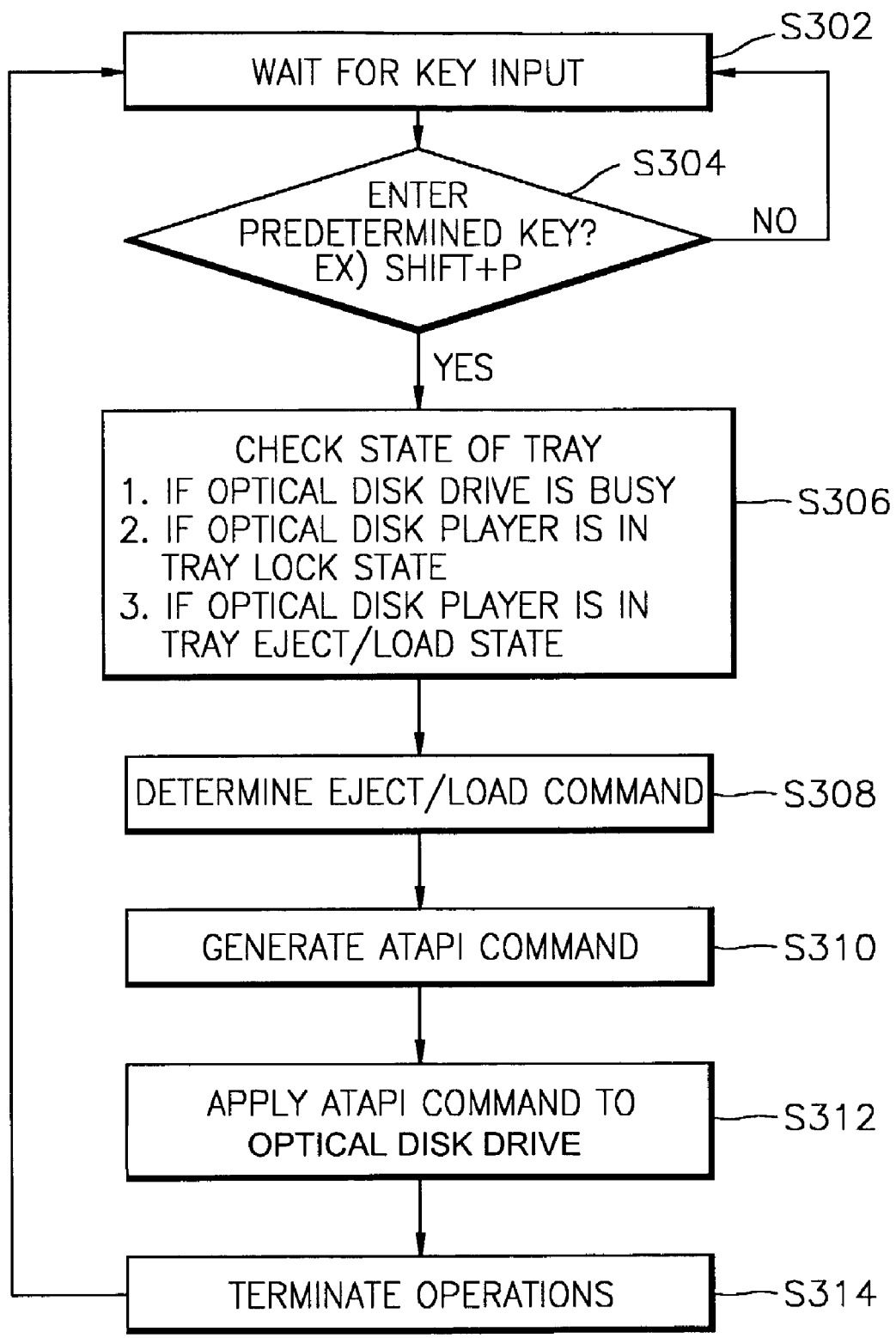
FIG. 3 is a flow chart illustrating operations of a program used to control the optical disk player according to an embodiment of the present invention.

FIG. 3 is a flow chart illustrating operations of a program used to control the optical disk player according to an embodiment of the invention. Once the PC has booted, the OS runs, and the optical disk control program is put into an execution state by the OS. In operation S302, the optical disk control program waits for a key input. In operation S304, if the key is entered via the keyboard, it checks whether a predetermined key or key combination, such as shift+p, is entered. If the predetermined key or key combination is not entered, operation S302 is repeated.

In operation S306, if the predetermined key or key combination is entered, the current state of the tray 102 is checked. The EJECT or LOAD command is applied to the optical disk player 100 as below after the current state of the optical disk player 100 is checked:

1. If the optical disk drive 100 is busy, the EJECT or LOAD command is not applied to the optical disk player 100. For example, when the optical disk drive 100 is performing an operation, such as READ, WRITE, or AUDIO PLAY, the EJECT or LOAD command is ignored.
2. If the optical disk player 100 is in a tray lock state, the EJECT or LOAD command is ignored.
3. If the optical disk player 100 is in a tray eject state, the LOAD command is applied to the optical disk player 100.
4. If the optical disk player 100 is in a tray load state, the EJECT command is applied to the optical disk player 100.

In operation S308, when the optical disk player is not busy or not in a tray lock state, it is determined to apply the EJECT/LOAD command to the optical disk player. In operations S310 and S312, the protocol ATAPI COMMAND is generated and is applied to the optical disk drive. In operation S314, the above operations are terminated and then, the cycle is repeated by returning to operation S302.

Figure 4:
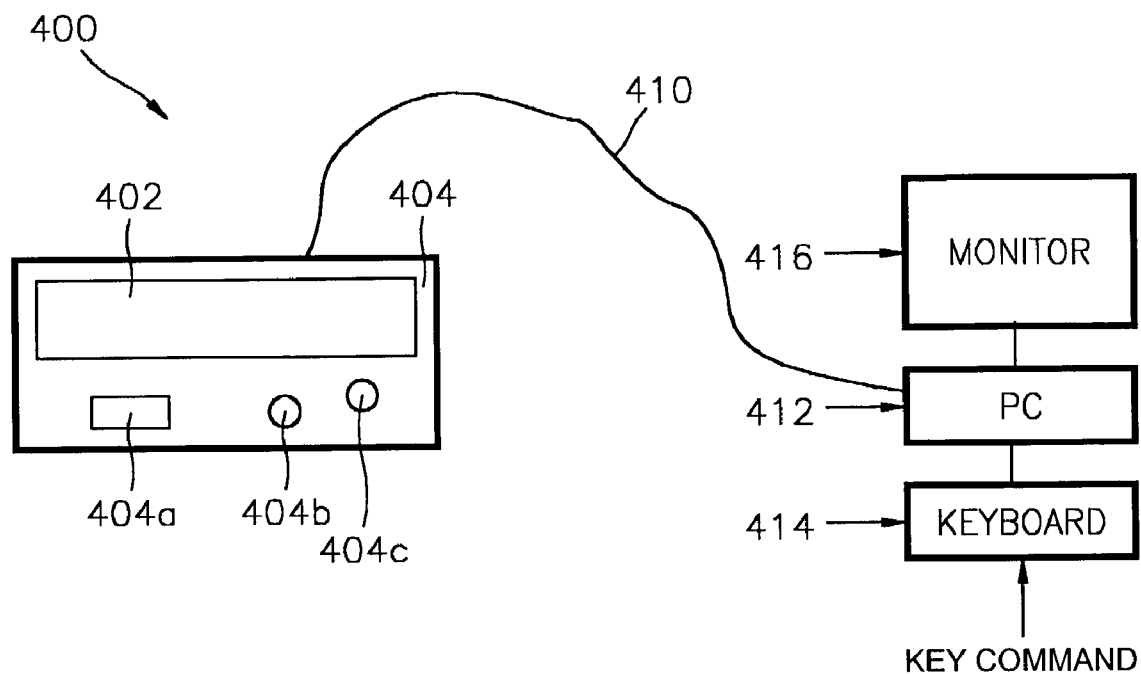
FIG. 4 is a block diagram illustrating the structure of an apparatus for ejecting/loading the optical disk player according to an embodiment of the present invention.

FIG. 4 is a block diagram illustrating the structure of an apparatus for ejecting/loading a tray 402 of an optical disk player 400 according to another embodiment of the present invention. The optical disk player 400 does not have an EJECT button as does the embodiment shown in FIG. 1, and the optical disk control program, which is to be installed in a PC 412, is built in the internal memory of the optical disk player 400. The optical disk player 400 is connected to the PC 412 through a connector 410, and a key board 414 and a monitor 416 are connected to the PC 412.

The tray 402 and a control panel 404 are installed on the optical disk player 400. A VOLUME button 404A, an operation instruction light-emitting diode (LED) 404B, an emergency eject hole 404C are installed on the control panel 404. When the optical disk player 400 is installed in the PC 412, the optical disk control program stored in the internal memory of the optical disk player 400 is installed in the PC 412.

First, if the optical disk control program is installed in the PC 412, a predetermined key or key combination, such as shift+p, can be entered via the keyboard 414, and the tray 402 of the optical disk player 400 is then ejected or loaded. The contents entered through the keyboard 414 are observed by the optical disk control program, and if the predetermined key or key combination is entered using the keyboard 414, the EJECT/LOAD command is applied to the optical disk player 400.

Figure 5:
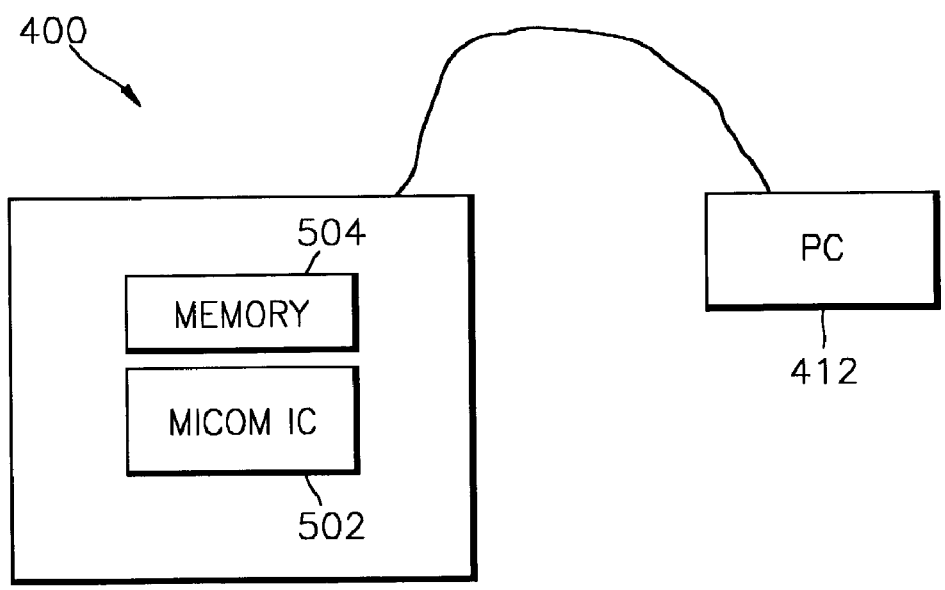
FIG. 5 schematically illustrates that the program to control an optical disk, stored in the optical disk player shown in FIG. 4, to be installed in a PC.

FIG. 5 schematically illustrates the program to control an optical disk as stored in the optical disk player 406 to be installed in the PC 412 shown in FIG. 4. A microprocessor 502 and memory 504 are in the optical disk player 400. In FIG. 5. The tray 402 is not shown for the sake of simplicity. The microprocessor 502 reads the optical disk control program from the memory 504 when the optical disk player 400 is installed in the PC 412 shown in FIG. 4 and provides the optical disk control program to the PC 412. The optical disk control program transmitted from the optical disk player 400 is installed as an application program to be used by the PC 412.

As described above, in the method for ejecting/loading the tray of the optical disk player according to the present invention, the tray of the optical disk player can be ejected/loaded using the keyboard or digitizer. Thus, there is no need to install the EJECT button on the optical disk player. Therefore, the productivity of the optical disk player increases, and manufacturing costs are reduced.

While described in terms of a personal computer connected through a connector, it is understood that the optical disk drive control program can be used with any processor through any connector or wireless connection. Further, it is understood that, while described in terms of use with computer systems, the optical disk drive control program can be used with a processor in a stereo receiver, portable audio devices such as MP3 players, televisions, programmable remote controls, and other similar devices for which the control of an optical disk drive would be desirable. Additionally, while shown as being externally connected to the computer, it is understood that the optical disk player can be installed internally within the computer. Also, while the control program has been described in terms of an optical disk drive control program, it is understood that the control program can be used with any device in which an object is controllable moved within the device using a tray or other holder for the object.

While this invention has been particularly shown and described with reference to embodiments thereof, it will be understood by those skilled in the art that various changes in form and details may be made therein without departing from the spirit and scope of the invention as defined by the accompanying claims and equivalents thereof.

What is claimed is:

1. A method of ejecting/loading a tray of an optical disk player, the method comprising:

storing an optical disk control program in a memory of the optical disk player, the optical disk control program to be installed in a personal computer (PC) and which controls ejection/loading of a tray of the optical disk player;

installing in the PC the optical disk control program stored in the memory of the optical disk player when the optical disk player is mounted on the PC; and using the optical disk control program to check whether a predetermined key is entered using a keyboard, and, if the predetermined key is entered, applying an EJECT or LOAD command to the optical disk player in response to the entered predetermined key using the optical disk control program so as to control the optical disk drive to eject or load the tray.

2. The method of claim 1, wherein the optical disk control program applies the EJECT or LOAD command to the optical disk player whenever a predetermined key combination including the predetermined key is entered using the keyboard.

3. The method of claim 2, wherein even though the predetermined key combination is entered using the keyboard, the optical disk control program ignores the entered key combination when the optical disk player is performing an operation comprising PLAY, WRITE, or AUDIO PLAY.

4. The method of claim 1, wherein, even though the key combination is entered using the keyboard, the optical disk control program ignores the entered predetermined key when the optical disk player is performing an operation comprising PLAY, WRITE, or AUDIO PLAY.

5. The method of claim 1, further comprising the operation showing a predetermined icon on a monitor connected to the PC, and using the optical disk control program to apply the EJECT or LOAD command to the optical disk player in response to a click of the icon using a digitizer connected to the PC.

6. The method of claim 5, wherein even though the icon is clicked, the optical disk control program ignores the clicked icon when the optical disk player is performing an operation comprising PLAY, WRITE, or AUDIO PLAY.

7. An apparatus for ejecting/loading a tray of an optical disk player, the apparatus comprising:

an optical disk player including the tray and an internal memory which stores an optical disk control program used to eject/load the tray of the optical disk player;

a computer to read the optical disk control program from the internal memory of the optical disk player and on which the optical disk player is mounted; and a keyboard to which an operation command of the computer is applied, wherein, if a predetermined key is entered using the keyboard, the optical disk control program read by the computer applies an EJECT or LOAD command to the optical disk player in response to the entered predetermined key.

8. The apparatus of claim 7, wherein the optical disk control program installed in the computer applies the EJECT or LOAD command to the optical disk player whenever a predetermined key combination including the predetermined key is entered using the keyboard.

9. The apparatus of claim 8, wherein even though the predetermined key combination is entered using the keyboard, the optical disk control program ignores the entered key combination when the optical disk player is performing an operation comprising PLAY, WRITE, or AUDIO PLAY.

10. The apparatus of claim 7, wherein even though the predetermined key is entered using the keyboard, the optical disk control program ignores the entered predetermined key when the optical disk player is performing an operation comprising PLAY, WRITE, or AUDIO PLAY.

11. The apparatus of claim 7, further comprising a monitor and a digitizer connected to the computer, wherein a predetermined icon is shown on the monitor and the optical disk control program applies the EJECT or LOAD command to the optical disk player in response to a click of the icon using the digitizer.

12. The apparatus of claim 11, wherein even though the icon is clicked, the optical disk control program ignores the clicked icon when the optical disk player is performing an operation comprising PLAY, WRITE, or AUDIO PLAY.

13. An optical disk player to record and/or reproduce an optical disk and to which a computer is connected, comprising:
a tray on which the optical disk is loaded into and out of the optical disk player by an eject/load operation;
a microprocessor; and
a memory in which an optical disk control program is stored, the optical disk control program to control the eject/load operation of the optical disk player after being installed in the computer,
wherein:
the optical disk control program is installed as an application program of the computer when the optical disk player is mounted on the computer, the installed optical disk control program checks whether a predetermined input is entered into the computer, and the installed optical disk control program controls the ejection/loading of the tray in response to the entered predetermined input, and
the microprocessor controls the installation of the optical disk control program to be stored in the memory of the computer when the optical disk player is mounted on the computer.

14. The optical disk player of claim 13, wherein the optical disk player is a device which is automatically recognized by the computer such that, when connected to the computer, the optical disk control program is automatically installed on the computer.

15. The optical disk player of claim 14, wherein the optical disk player is a plug and play device.

16. The optical disk player of claim 13, wherein the predetermined input comprises a predetermined key entered through a keyboard connected to the computer.

17. The optical disk player of claim 13, wherein the predetermined input comprises a predetermined key combination entered through a keyboard connected to the computer.

18. The optical disk player of claim 13, wherein the predetermined input comprises a an icon displayed on a display connected to the computer and which is clicked by a digitizer connected to the computer.

19. The optical disk player of claim 13, wherein the optical disk player does not include an external button which controls the eject/load operation of the tray.

20. The optical disk player of claim 13, wherein the optical disk control program generates an appropriate ATAPI command to control the eject/load operation of the optical disk player when the predetermined input is received by the computer.

21. A device which is connected to a computer, comprising:
a housing;
a tray which is controlled to move relative to the housing; and
a memory in which a device control program is stored, the device control program to control the movement of the tray relative to the housing after being installed in the computer to which the device is connected,
wherein:
the device control program is installed as an application program of the computer when the device is mounted on the computer, the installed device control program checks whether a predetermined input is entered into the computer, and the installed device control program controls the movement of the tray in response to the entered predetermined input.

22. The device of claim 21, wherein the device is automatically recognized by the computer such that, when connected to the computer, the device control program is automatically installed on the computer.

23. The device of claim 22, wherein the device is a plug and play device.

24. The device of claim 21, wherein the predetermined input comprises a predetermined key entered through a keyboard connected to the computer.

25. The device of claim 21, wherein the predetermined input comprises a predetermined key combination entered through a keyboard connected to the computer.

26. The device of claim 21, wherein the predetermined input comprises a an icon displayed on a display connected to the computer and which is clicked by a digitizer connected to the computer.

27. The device of claim 21, wherein the device control program further selectively ignores the predetermined input where the device is performing selected activities when the predetermined input is entered.

28. The device of claim 27, wherein one of the selected activities comprises the computer accessing an object disposed on the tray so as to read or write information with respect to the object.

29. A method of controlling the ejecting/loading a tray of a device, the method comprising:
obtaining a control program which is to be loaded into another device to which the device is to be connected and, after being loaded into the another device, controls the movement of the tray of the device from which the control program was loaded; and
storing the control program in a memory of the device.

30. The method of claim 29, wherein the obtaining the control program further comprises obtaining the control program with an ability to be automatically loaded in the another device when the device is connected to the another device.

31. The method of claim 29, wherein:
the device comprises a recording and/or reproducing device to record and/or reproduce data with respect to a medium disposed on the tray, and
the control program controls the ejection/loading of the tray so as to allow the medium to be selectively located to be recorded and/or reproduced by the recording and/or reproducing device.

32. The method of claim 31, wherein the recording and/or reproducing device comprises an optical disk drive, and the medium comprises an optical disk compatible with the optical disk drive.

* * * * *

UNITED STATES PATENT AND TRADEMARK OFFICE
CERTIFICATE OF CORRECTION

PATENT NO. : 7,184,372 B2
APPLICATION NO. : 10/231054
DATED : February 27, 2007
INVENTOR(S) : Young-won Lee et al.

It is certified that error appears in the above-identified patent and that said Letters Patent is hereby corrected as shown below:

Column 7, Line 57, after "comprises" delete "a".

Column 8, Line 31, after "comprises" delete "a".

Signed and Sealed this

Twelfth Day of June, 2007

JON W. DUDAS
*Director of the United States Patent and Trademark Office*